(12) United States Patent
Ho

(10) Patent No.: US 9,702,501 B2
(45) Date of Patent: Jul. 11, 2017

(54) SUPPORT DEVICE FOR MONITOR OR DISPLAY

(71) Applicant: Chih Feng Ho, Taipei (TW)

(72) Inventor: Chih Feng Ho, Taipei (TW)

(73) Assignee: Oxti Corporation, Taipei (TW)

( * ) Notice: Subject to any disclaimer, the term of this patent is extended or adjusted under 35 U.S.C. 154(b) by 0 days.

(21) Appl. No.: 14/955,243

(22) Filed: Dec. 1, 2015

(65) Prior Publication Data
US 2017/0152986 A1 Jun. 1, 2017

(51) Int. Cl.
*F16M 11/04* (2006.01)
*H05K 5/02* (2006.01)

(52) U.S. Cl.
CPC ......... *F16M 11/046* (2013.01); *H05K 5/0234* (2013.01); *F16M 2200/027* (2013.01); *F16M 2200/047* (2013.01)

(58) Field of Classification Search
CPC ...... F16M 11/046; F16M 11/10; F16M 11/18; F16M 2200/027; F16M 2200/047; H05K 5/0234
USPC .................................................. 248/123.11
See application file for complete search history.

(56) References Cited

U.S. PATENT DOCUMENTS

| | | |
|---|---|---|
| 3,345,024 A | 10/1967 | Maurice |
| 4,834,329 A | 5/1989 | Delapp |
| 4,880,270 A | 11/1989 | Cooper |
| 5,037,054 A | 8/1991 | McConnell |
| 5,123,621 A | 6/1992 | Gates |
| 5,553,820 A | 9/1996 | Karten et al. |
| 5,713,549 A | 2/1998 | Shieh |
| 5,758,849 A | 6/1998 | Bui et al. |
| 6,213,438 B1 | 4/2001 | Ostby et al. |
| 6,712,321 B1 * | 3/2004 | Su ........................ F16M 11/105 248/123.11 |
| 6,766,994 B2 | 7/2004 | Serbinski et al. |
| 6,796,537 B1 | 9/2004 | Lin |
| 6,863,252 B2 | 3/2005 | Bosson |
| 7,044,423 B2 * | 5/2006 | Bober .................. A47B 81/064 248/188.1 |
| 7,413,150 B1 * | 8/2008 | Hsu ........................ F16M 11/10 248/123.11 |
| 7,413,152 B1 | 8/2008 | Chen |
| 7,628,552 B2 | 12/2009 | Coppola |
| 7,644,897 B2 | 1/2010 | Shin |
| 7,722,003 B2 | 5/2010 | Ishizaki et al. |
| 7,780,125 B2 * | 8/2010 | Yen ........................ F16M 11/10 248/125.1 |
| 7,784,747 B2 | 8/2010 | Gan et al. |

(Continued)

*Primary Examiner* — Anita M King
(74) *Attorney, Agent, or Firm* — Charles E. Baxley

(57) ABSTRACT

A support device includes a supporting arm supported on a stationary base, a guiding device attached to the supporting arm and having two channels, a sliding member includes two limbs slidably engaged with the channels of the guiding device for guiding the sliding member to move relative to the guiding device, a carrier is attached to the sliding member for supporting an object, and a spring biasing member is connected between the guiding device and the sliding member for applying a spring biasing force to the sliding member. A friction member is attached to the sliding member and frictionally engaged with the guiding device for applying a resistive force to the sliding member.

7 Claims, 5 Drawing Sheets

(56) References Cited

U.S. PATENT DOCUMENTS 8,074,948 B2 * 12/2011 Zou ..................... F16M 11/046
                                                    248/123.11
9,279,537 B2 *  3/2016 Hung .................... F16M 11/18

* cited by examiner

SUPPORT DEVICE FOR MONITOR OR DISPLAY

BACKGROUND OF THE INVENTION

1. Field of the Invention

The present invention relates to a stable support device, and more particularly to a stable support device including a sliding structure or mechanism for coupling or attaching or mounting a carrier to a supporting stand and to support various objects, such as monitors, displays, keyboards, antenna members, or the like, and for providing a solid and stable supporting stand to solidly and stably support the carrier and the objects, such as the monitors, the displays, the keyboards, the antenna members, or the like.

2. Description of the Prior Art

Various kinds of typical carriers or support devices have been developed and comprise a supporting member or carrier member attached or mounted or supported on a supporting stand and for supporting various objects, such as monitors, displays, keyboards, antenna members, or the like.

For example, U.S. Pat. No. 3,345,024 to Maurice, U.S. Pat. No. 4,834,329 to Delapp, U.S. Pat. No. 4,880,270 to Cooper, U.S. Pat. No. 5,037,054 to McConnell, U.S. Pat. No. 5,123,621 to Gates, U.S. Pat. No. 5,553,820 to Karten et al., U.S. Pat. No. 5,713,549 to Shieh, U.S. Pat. No. 5,758,849 to Bui et al., U.S. Pat. No. 6,213,438 to Ostby et al., U.S. Pat. No. 6,766,994 to Serbinski et al., U.S. Pat. No. 6,796,537 to Lin, U.S. Pat. No. 6,863,252 to Bosson, U.S. Pat. No. 7,413,152 to Chen, U.S. Pat. No. 7,628,552 to Coppola, U.S. Pat. No. 7,644,897 to Shin, U.S. Pat. No. 7,722,003 to Ishizaki et al., and U.S. Pat. No. 7,784,747 to Gan et al. disclose several of the typical support devices or carrier devices each also comprising a support member or carrier member pivotally or rotatably attached or mounted or coupled to a supporting stand with one or more pivotal arms for supporting various objects, such as monitors, displays, keyboards, antenna members, or the like.

However, normally, the support members or carrier members and the pivotal arms and the supporting stands include a rather complicated structure or configuration and are pivotally or rotatably coupled together with pivot joints or axles and are adjustable to different angular positions by a frictional force between the members or elements that may not solidly and stably support the carrier and the objects in place, and the supporting stands normally include a structure or configuration that may not be used to solidly and stably support the support members or carrier members in the required position.

The present invention has arisen to mitigate and/or obviate the afore-described disadvantages of the conventional support devices for monitors, displays, keyboards, antenna members, or other display apparatuses.

SUMMARY OF THE INVENTION

The primary objective of the present invention is to provide a stable support device including a sliding structure or mechanism for coupling or attaching or mounting a carrier to a supporting stand and to support various objects, such as monitors, displays, keyboards, antenna members, or the like, and for providing a solid and stable supporting stand to solidly and stably support the carrier and the objects, such as the monitors, the displays, the keyboards, the antenna members, or the like.

The other objective of the present invention is to provide a stable support device including a friction member frictionally engaged with a guiding device for applying a resistive force to a sliding member and for frictionally anchoring or retaining the sliding member at the selected position relative to the guiding device and the supporting arm.

In accordance with one aspect of the invention, there is provided a support device comprising a stationary base, a supporting arm supported on the stationary base, a guiding device attached to the supporting arm, a sliding member slidably attached to the guiding device, a carrier attached to the sliding member for supporting an object on the carrier, a spring biasing member connected between the guiding device and the sliding member for applying a spring biasing force to the sliding member for retaining the sliding member and the carrier at a selected position relative to the guiding device and the supporting arm, and a friction member attached to the sliding member and frictionally engaged with the guiding device for applying a resistive force to the sliding member and for retaining or positioning the sliding member and the carrier at the selected or required position relative to the guiding device and the supporting arm.

The guiding device includes two channels formed therein, and the sliding member includes two limbs slidably engaged with the channels of the guiding device respectively for guiding the sliding member to move relative to the guiding device and the supporting arm.

The guiding device includes two slots formed therein and communicating with the channels of the guiding device respectively, and the sliding member includes two links slidably engaged with the slots of the guiding device respectively. The sliding member includes a bracket connected to the limbs with the links for attaching the carrier and the like.

The sliding member includes two rollers attached to the limbs of the sliding member and slidably engaged with the channels of the guiding device respectively. The guiding device includes a limiting device attached to the guiding device, and the limiting device includes a guiding passage formed therein for slidably engaging with the sliding member.

The limbs of the sliding member are provided for attaching the friction member. The sliding member includes a depression formed in the limb for receiving and engaging with the friction member. The friction member has a middle portion secured to the sliding member and includes at least one end portion frictionally contacted and engaged with the guiding device for applying the resistive force to the sliding member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
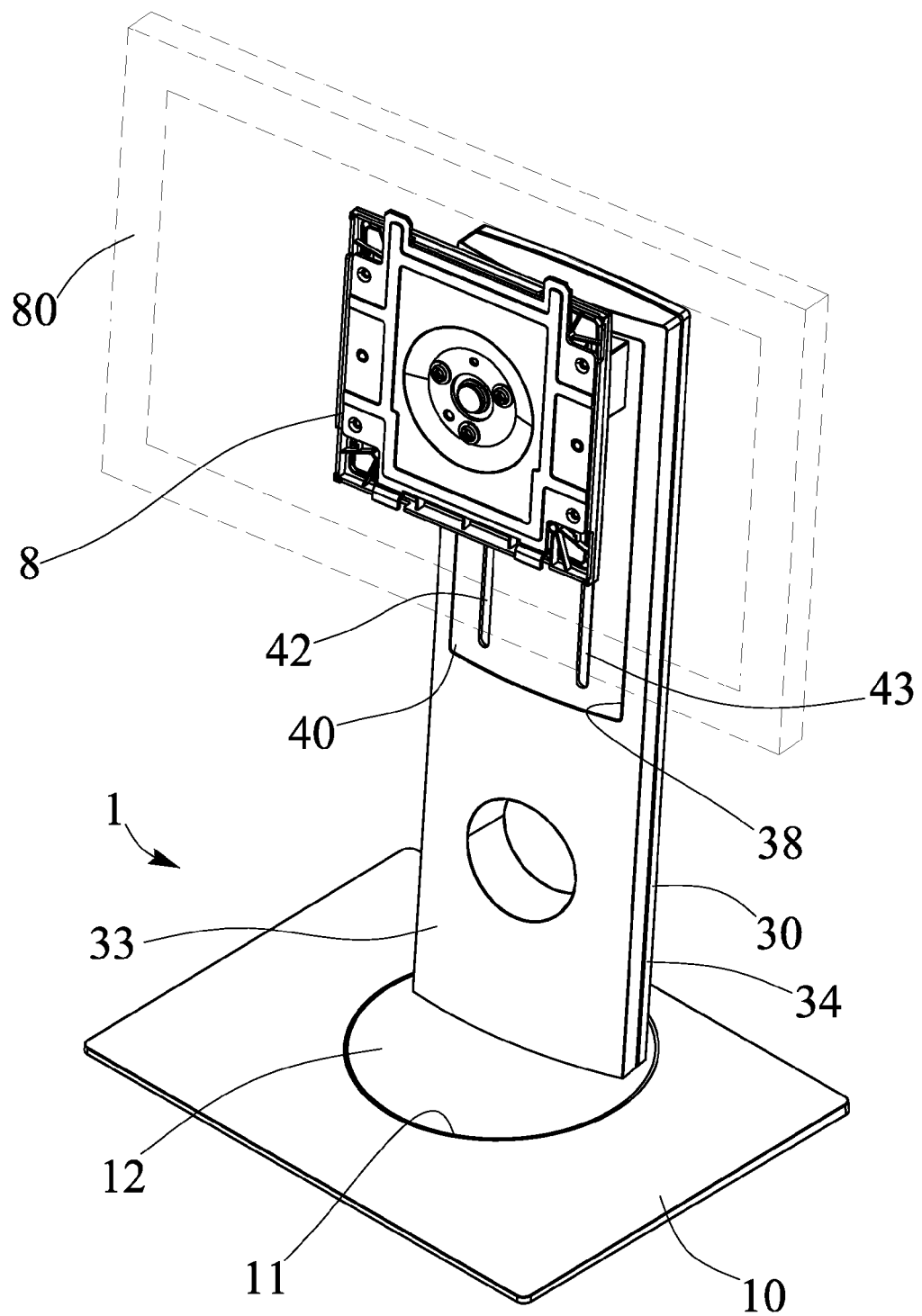
FIG. 1 is a partial front perspective view illustrating the operation of a stable support device in accordance with the present invention.
Figure 2:
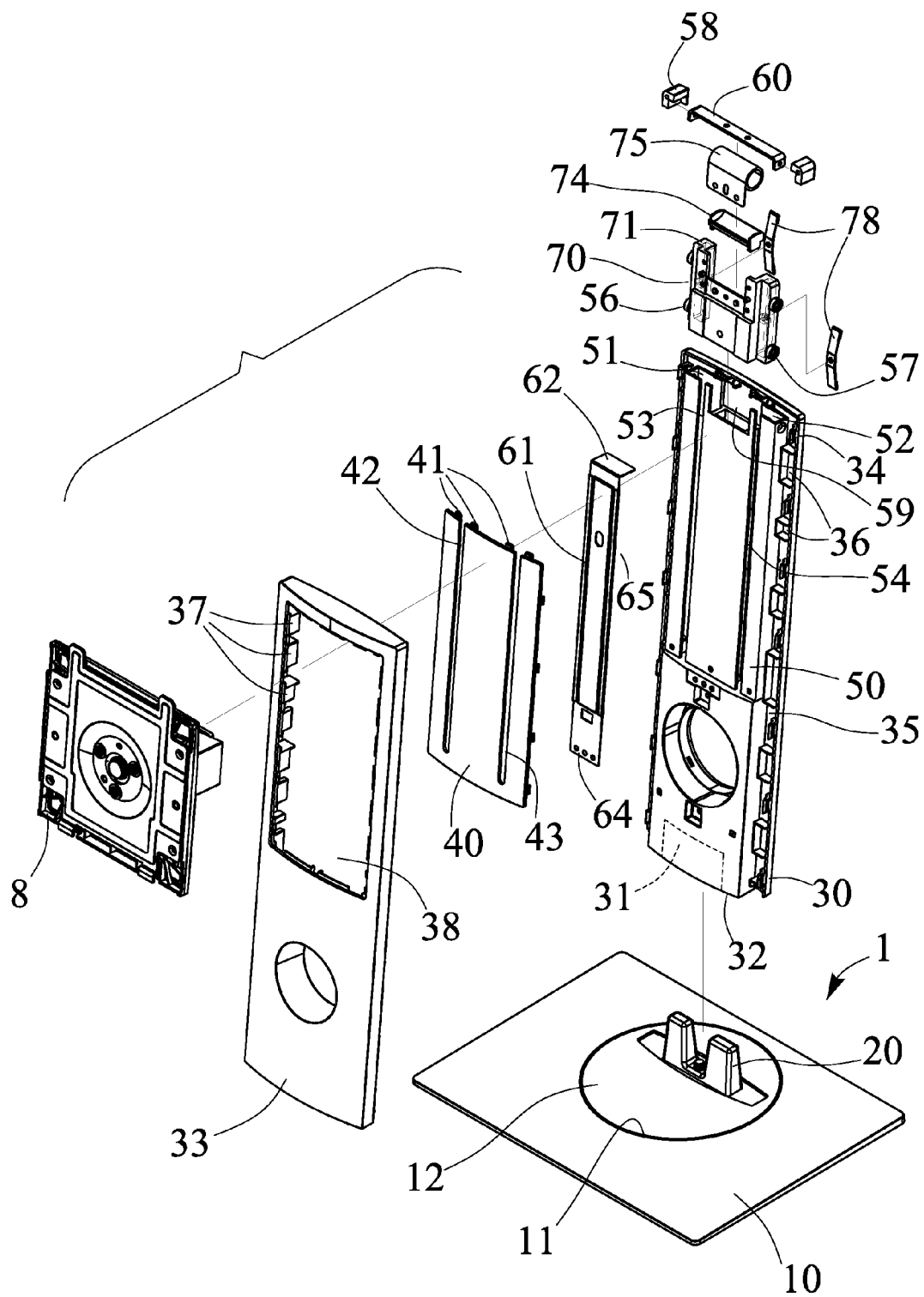
FIG. 2 is a partial exploded view of the stable support device.

Referring to the drawings, and initially to FIGS. 1-2, a stable support device in accordance with the present invention comprises a stable supporting stand 1 including a stationary base 10 having a depression or recess 11 formed therein for pivotally or rotatably receiving or supporting or engaging with a rotary disc or seat 12 therein, and including an upright column or projection or post 20 extended upwardly from the stationary base 10 and/or the rotary seat 12. The supporting stand 1 further includes another projection or upright column or supporting arm 30 for engaging with the post 20 and for stably or solidly securing or anchoring or retaining or positioning or supporting the supporting arm 30 on the stationary base 10 at the perpendicular or tilted or inclined or upright position relative to the stationary base 10.

For example, as shown in FIG. 2, the supporting arm 30 includes a cavity 31 formed or provided in the lower or bottom portion 32 thereof and opened downwardly for selectively receiving or engaging with the post 20 and for allowing the supporting arm 30 to be solidly or stably supported and positioned on the stationary base 10. The supporting arm 30 may include or may be formed by one or more (such as two) housing members 33, 34 for forming or defining a chamber or compartment 35 therein and/or between the two housing members 33, 34 and for receiving various parts or elements therein which will be described in further details hereinafter. One of the two housing members 34 includes one or more engaging sockets 36 formed or provided therein (FIG. 2), and the other housing member 33 includes one or more engaging or positioning or retaining or anchoring keys or pegs 37 extended therefrom for engaging with the sockets 36 and for detachably or removably mounting or securing the housing members 33, 34 together.

The supporting arm 30 further includes an opening 38 formed therein (FIG. 2), such as formed in the front housing member 33 for receiving or engaging with a shield or cover 40, the cover 40 includes one or more engaging keys or pegs or tongues or catches 41 extended therefrom (FIG. 2) for engaging with the front housing member 33 and for detachably or removably mounting or securing the cover 40 to the front housing member 33 of the supporting arm 30, and the cover 40 includes one or more (such as two) longitudinal slots or grooves 42, 43 formed therein and parallel to each other. The supporting arm 30 further includes a track rail or guiding device 50 provided or disposed or engaged in the chamber 35 of the supporting arm 30 and attached or mounted or secured to the supporting arm 30 with screws or bolts or latches or fasteners (not illustrated).

Figure 5:
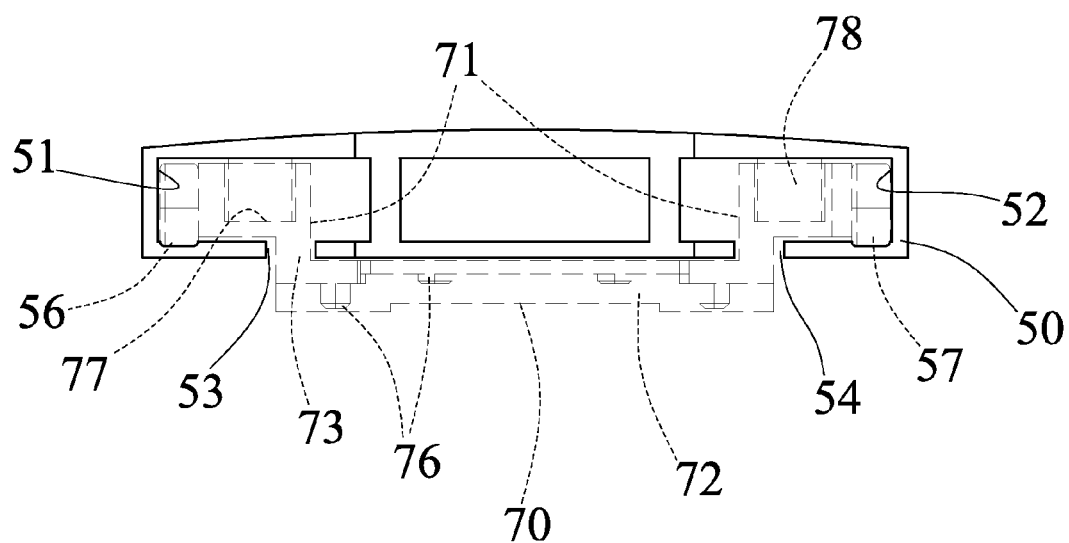
FIG. 5 is a partial top plan schematic view of the supporting arm of the stable support device.

As shown in FIGS. 2 and 5, the guiding device 50 includes one or more (such as two) channels 51, 52 formed or provided therein and parallel to each other, and includes one or more (such as two) grooves or slots 53, 54 formed therein and parallel to each other and communicating with the channels 51, 52 thereof respectively and aligned with the grooves 42, 43 of the cover 40 respectively, and includes a notch 59 formed therein (FIG. 2), such as formed in the upper portion of the guiding device 50 and communicating with the channels 51, 52 of the guiding device 50.

Another cover or cap 60 is attached or mounted or secured to the upper portion of the guiding device 50 with one or more (such as two) elbows 58 for enclosing or blocking the upper portion of the guiding device 50. An anchoring or retaining or limiting device 61 is attached or mounted or secured to the guiding device 50 and arranged or positioned between the guiding device 50 and the cover 40 and located between the slots 53, 54 of the guiding device 50. The limiting device 61 includes an upper flap 62 extended therefrom (FIG. 2) and secured to the cap 60 or the guiding device 50, and includes a lower or bottom panel 64 extended therefrom (FIG. 2) and secured to the guiding device 50 for forming or defining a guiding passage 65 in the limiting device 61 and between the flap 62 and the bottom panel 64.

A follower or sliding member 70 includes one or more (such as two) posts or legs or limbs 71 (FIGS. 2, 5) slidably received or engaged in the channels 51, 52 of the guiding device 50 respectively for guiding the sliding member 70 to slide or move relative to the guiding device 50 and the supporting arm 30, and includes a bracket 72 coupled to and arranged or located between the limbs 71 and connected or coupled to the limbs 71 with links 73, in which the links 73 are slidably received or engaged in the slots 53, 54 of the guiding device 50 and the grooves 42, 43 of the cover 40 for allowing the bracket 72 to be located out of the guiding device 50 and the cover 40, and the bracket 72 is slidably received or engaged in the guiding passage 65 of the limiting device 61 and guided or limited to slide or move between the flap 62 and the bottom panel 64 of the limiting device 61, for preventing the sliding member 70 from being disengaged or separated from the guiding device 50 and the supporting arm 30.

It is preferable that a bar 74 is attached or mounted or secured to the sliding member 70, and a spring biasing member 75, such as a coil spring 75 is connected or coupled between the cap 60 and/or the guiding device 50 and the catches or fasteners 76 of the sliding member 70 for applying a resilient or puling or spring biasing force to the sliding member 70. As shown in FIGS. 1-4, a carrier 8 is attached or mounted or secured to the sliding member 70 and moved in concert with the sliding member 70 for engaging with and for supporting various objects 80 (FIG. 1), such as monitors, displays, keyboards, antenna members, or the like and for detachably or removably or adjustably supporting the objects 80 on the supporting arm 30 and the stationary base 10. The above-described sliding attachment or engagement of the carrier 8 with the sliding member 70 is not related to the present invention and will not be described in further details.

As shown in FIGS. 2-5, a number of wheels or rollers 56, 57 are attached or mounted or secured to the limbs 71 of the sliding member 70 and moved or engaged in the channels 51, 52 of the guiding device 50 respectively and contacted or engaged with the guiding device 50 for guiding and facilitating the sliding movement of the sliding member 70 relative to the guiding device 50 and the supporting arm 30. As best shown in FIG. 5, the sliding member 70 may further include one or more (such as two) recesses or depressions 77 formed therein, such as formed in the limbs 71 respectively for receiving or engaging with friction members 78 respectively. For example, the friction members 78 each include a middle or intermediate portion attached or mounted or secured to the sliding member 70 with screws or bolts or latches or fasteners (not illustrated).

Figure 3:
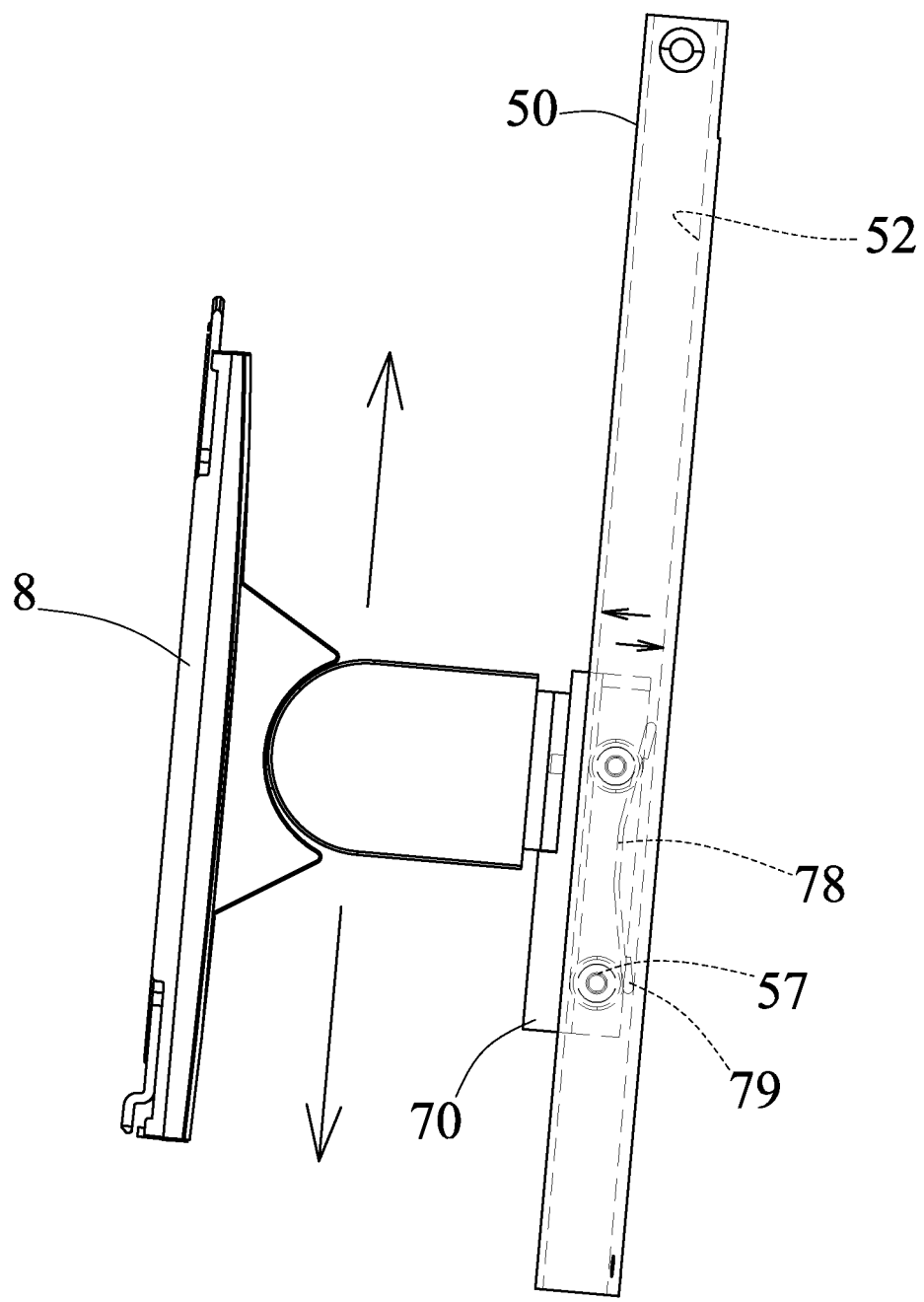
FIG. 3 is a partial right plan schematic view of the stable support device.
Figure 4:
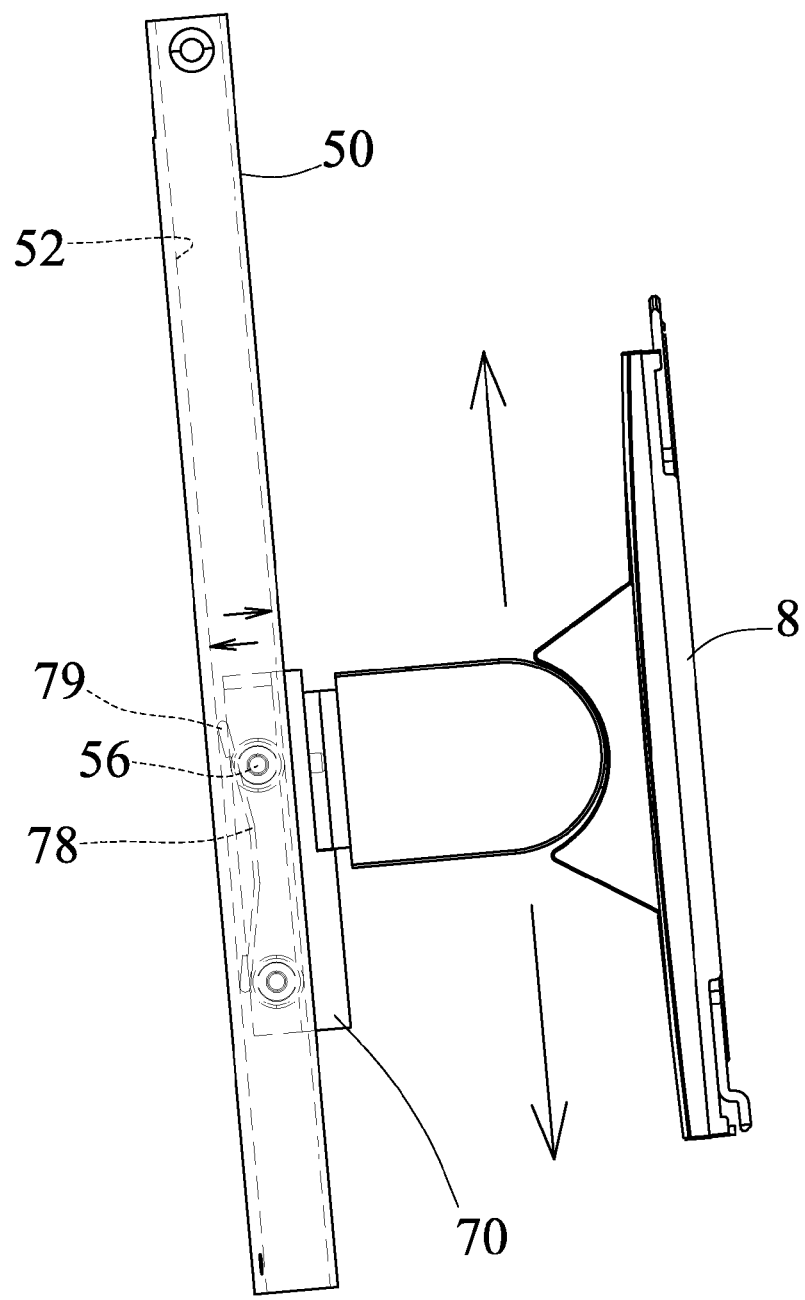
FIG. 4 is a partial left plan schematic view of the stable support device.

As best shown in FIGS. 3 and 4, the friction members 78 each include two end portions 79 frictionally contacted or engaged with the guiding device 50 for applying a resistive or retarding force to the sliding member 70 and for frictionally anchoring or retaining or positioning the sliding member 70 and the carrier 8 and the objects 80 at the selected or required position or location relative to the guiding device 50 and the supporting arm 30.

In operation, the sliding member 70, and the carrier 8 and the objects 80 that are attached to and carried on the sliding member 70 may be moved up and down along the grooves 42, 43 of the cover 40 and the slots 53, 54 of the guiding device 50, and the spring biasing member 75 that is connected or coupled between the cap 60 and/or the guiding device 50 and the sliding member 70 may apply a resilient or puling or spring biasing force to the sliding member 70 for retaining or positioning the sliding member 70 and the carrier 8 and the objects 80 at the selected or required position or location relative to the guiding device 50 and the supporting arm 30. The friction members 78 which is attached or mounted or secured to the sliding member 70 may frictionally contact or engage with the guiding device 50 for applying a resistive or retarding force to the sliding member 70 and for frictionally anchoring or retaining or positioning the sliding member 70 and the carrier 8 and the objects 80 at the selected or required position or location relative to the guiding device 50 and the supporting arm 30. The sliding engagement of the rollers 56, 57 of the sliding member 70 with the guiding device 50 may facilitate the sliding movement of the sliding member 70 relative to the guiding device 50 and the supporting arm 30.

Accordingly, the stable support device in accordance with the present invention includes a sliding structure for attaching a carrier to a supporting stand and to support various objects, such as monitors, displays, keyboards, antenna members, or the like, and for providing a solid and stable supporting stand to solidly and stably support the carrier and the objects, such as the monitors, the displays, the keyboards, the antenna members, or the like.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A support device comprising:
a stationary base,
a supporting arm supported on said stationary base,
a guiding device attached to said supporting arm,
a limiting device attached to said guiding device, said limiting device including a guiding passage formed therein,
a sliding member slidably attached to said guiding device, said guiding passage of said limiting device being provided for slidably engaging with said sliding member,
a carrier attached to said sliding member for supporting an object on said carrier,
a spring biasing member connected between said guiding device and said sliding member for applying a spring biasing force to said sliding member for retaining said sliding member and said carrier at a selected position relative to said guiding device and said supporting arm, and
a friction member attached to said sliding member and frictionally engaged with said guiding device for applying a resistive force to said sliding member.

2. The stable support device as claimed in claim 1, wherein said friction member includes at least one end portion frictionally contacted and engaged with said guiding device for applying said resistive force to said sliding member.

3. A support device comprising:
a stationary base,
a supporting arm supported on said stationary base,
a guiding device attached to said supporting arm,
a sliding member slidably attached to said guiding device,
a carrier attached to said sliding member for supporting an object on said carrier,
a spring biasing member connected between said guiding device and said sliding member for applying a spring biasing force to said sliding member for retaining said sliding member and said carrier at a selected position relative to said guiding device and said supporting arm, and
a friction member attached to said sliding member and frictionally engaged with said guiding device for applying a resistive force to said sliding member, wherein
said guiding device includes two channels formed therein, and said sliding member includes two limbs slidably engaged with said channels of said guiding device respectively for guiding said sliding member to move relative to said guiding device and said supporting arm.

4. The stable support device as claimed in claim 3, wherein said guiding device includes two slots formed therein and communicating with said channels of said guiding device respectively, and said sliding member includes two links slidably engaged with said slots of said guiding device respectively.

5. The stable support device as claimed in claim 4, wherein said sliding member includes a bracket connected to said limbs with said links.

6. The stable support device as claimed in claim 3, wherein said sliding member includes two rollers attached to said limbs of said sliding member and slidably engaged with said channels of said guiding device respectively.

7. The stable support device as claimed in claim 3, wherein said limbs of said sliding member each include a depression formed in the respective limbs for receiving and engaging with said friction member.

\* \* \* \* \*